United States Patent
Zgraggen et al.

(10) Patent No.: US 10,742,718 B1
(45) Date of Patent: Aug. 11, 2020

(54) DISTRIBUTED COMPUTING SYSTEM NODE MANAGEMENT

(71) Applicant: Amazon Technologies, Inc., Seattle, WA (US)

(72) Inventors: Guido Beat Zgraggen, Seattle, WA (US); Christopher Ryan Mhley, Seattle, WA (US); Darren James Alton, Seattle, WA (US); Adam Julio Villalobos, Kirkland, WA (US); Eric Benjamin Merritt, Edmonds, WA (US); Xiao Zeng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 14/582,006

(22) Filed: Dec. 23, 2014

(51) Int. Cl.
*G06F 15/16* (2006.01)
*H04L 29/08* (2006.01)

(52) U.S. Cl.
CPC .................... *H04L 67/10* (2013.01)

(58) Field of Classification Search
CPC ...................................... H04L 67/10
USPC ........................................... 709/204
See application file for complete search history.

(56) References Cited

U.S. PATENT DOCUMENTS

| | | | |
|---|---|---|---|
| 6,065,117 A | 5/2000 | White | |
| 6,411,967 B1 | 6/2002 | Van Renesse | |
| 7,603,464 B2 * | 10/2009 | White | H04L 67/16 |
| | | | 709/226 |
| 7,627,644 B2 | 12/2009 | Slack-Smith | |
| 8,606,875 B1 * | 12/2013 | Chouanard | H04L 9/3268 |
| | | | 709/217 |
| 8,998,719 B1 * | 4/2015 | Walker | A63F 13/355 |
| | | | 463/37 |
| 2001/0033548 A1 * | 10/2001 | Saleh | H04J 14/0295 |
| | | | 370/218 |
| 2005/0021758 A1 | 1/2005 | White | |
| 2006/0242414 A1 * | 10/2006 | Corson | H04L 63/0807 |
| | | | 713/171 |
| 2006/0248212 A1 | 11/2006 | Sherer et al. | |
| 2007/0005603 A1 | 1/2007 | Jain et al. | |
| 2008/0189764 A1 * | 8/2008 | Gronholm | G06F 15/16 |
| | | | 726/3 |
| 2009/0037367 A1 | 2/2009 | Wein | |
| 2009/0089780 A1 | 4/2009 | Johnson et al. | |
| 2009/0157855 A1 | 6/2009 | Adam et al. | |

(Continued)

*Primary Examiner* — Kevin T Bates
*Assistant Examiner* — Clarence D McCray
(74) *Attorney, Agent, or Firm* — BakerHostetler (57) ABSTRACT

Techniques for distributed computing system node management are described herein. In some cases, internal compute nodes (i.e., compute nodes that are allocated to the distributed system) may be mutually trusted such that they may freely establish communications with one another. By contrast, external compute nodes (i.e., compute nodes that aren't allocated to the distributed computing system) may be untrusted such that their access to the distributed system may be regulated. In some cases, one or more of the compute nodes within the distributed computing system may maintain respective collections of system view information. Each respective collection of system view information may include, for example, information associated with the corresponding compute node's view of the distributed computing system based on information that is available to the corresponding compute node.

15 Claims, 7 Drawing Sheets

(56) References Cited

U.S. PATENT DOCUMENTS

| | | |
|---|---|---|
| 2009/0287821 A1 | 11/2009 | Luzzatti et al. |
| 2010/0306383 A1 | 12/2010 | Luzzatti et al. |
| 2011/0263332 A1* | 10/2011 | Mizrachi ................. A63F 13/12 |
| | | 463/42 |
| 2012/0072720 A1* | 3/2012 | Rescorla ............... H04L 9/3268 |
| | | 713/158 |
| 2013/0225282 A1* | 8/2013 | Williams .............. A63F 13/216 |
| | | 463/29 |
| 2013/0250799 A1* | 9/2013 | Ishii ....................... H04L 47/12 |
| | | 370/252 |
| 2013/0275549 A1* | 10/2013 | Field ....................... G06F 21/10 |
| | | 709/217 |
| 2014/0280959 A1 | 9/2014 | Bauer |
| 2014/0295864 A1 | 10/2014 | Gunnarsson et al. |
| 2015/0039748 A1 | 2/2015 | Draznin et al. |
| 2015/0084757 A1 | 3/2015 | Annibale et al. |

\* cited by examiner

DISTRIBUTED COMPUTING SYSTEM NODE MANAGEMENT

CROSS-REFERENCE TO RELATED APPLICATIONS

This application is related to the following applications, each of which is hereby incorporated by reference in its entirety: U.S. patent application Ser. No. 14/582,051 filed Dec. 23, 2014, entitled "DISTRIBUTED COMPUTING SYSTEM NODE MANAGEMENT"; U.S. patent application Ser. No. 14/582,038 filed Dec. 23, 2014, entitled "DISTRIBUTED COMPUTING SYSTEM NODE MANAGEMENT".

BACKGROUND

In some cases, it may be advantageous for various computing services to be provided by multiple different compute nodes within a distributed computing system. In some cases, each compute node within the distributed computing system may only have limited knowledge of information associated with services executing on other compute nodes within the distributed computing system. These and other limitations may present problems and result in various inefficiencies when compute nodes within the distributed system communicate and work with one another. For example, in some cases, a particular node may need to select another node in the system with which to establish communications and/or to which to offload work. With only limited information about the other nodes in the system, it may be difficult to make such decisions in an efficient and practical manner. Additionally, in some cases, an external compute node, such as a remote client, may wish to access one or more services provided by the distributed computing system. It may be difficult to manage such communications in a secure and efficient manner using only limited information about the compute nodes within the distributed computing system.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for distributed computing system node management are described herein. In some cases, a distributed system may include multiple different compute nodes for providing of services. Each of the multiple different compute nodes may execute one or more services, which may be, for example, individually executed services, micro-services, and/or portions of collectively executed services. In some cases, internal compute nodes (i.e., compute nodes that are allocated to the distributed system) may be mutually trusted such that they may freely establish communications with one another. By contrast, external compute nodes (i.e., compute nodes that aren't allocated to the distributed computing system) may be untrusted such that their access to the distributed system may be regulated. In some cases, an entry point compute node within the distributed system may be operable to regulate access to the distributed computing system by external compute nodes. For example, an external compute node, such as a client, may request one or more services provided by the distributed computing system. The entry point compute node may perform operations, such as authenticating of the external compute node for communication with the distributed computing system, selection of one or more particular internal compute nodes for communication with the external compute node, inspection and validation of particular messages from the external compute node to the distributed computing system, and the like.

In some cases, one or more of the compute nodes within the distributed computing system may maintain respective collections of system view information. Each respective collection of system view information may include, for example, information associated with the corresponding compute node's view of the distributed computing system based on information that is available to the corresponding compute node. System view information is information associated with the distributed computing system that may include, for example, indications of compute nodes within the distributed system, their associated devices and/or geographic locations, the services executing thereon, service workload information, information associated with latency for communicating with other nodes and/or services, idle status and/or non-idle status, availability status, and the like. In some cases, system view information may be exchanged, at least in part, among compute nodes using an epidemic protocol. Also, in some cases, in addition or as an alternative to the epidemic protocol, compute nodes may also update their respective collections of system view information using naturally occurring interactions among compute nodes. For example a first compute node and a second compute node may establish a communications channel that enables interaction between one or more services on the different compute nodes. While the communications channel is active, the first compute node and second compute nodes may use the communications channel to exchange information about each other and the services that they each execute, and this information may be used to update each compute node's respective collection of system view information.

In some cases, a compute node may use its respective collection of system view information to assist in making various operational decisions. For example, a particular service may sometimes need to select another service on another compute with which to communicate. In some cases, the particular service may employ system view information regarding workloads of other services and latency for communication with other services to assist in selecting one of the other services with which to communicate. Additionally, the particular service may also use system view information to select another service to which to offload work. Furthermore, in some cases, a particular node may use system view information to probabilistically allocate additional nodes to the distributed computing system and/or de-allocate nodes from the distributed computing system.

Figure 1:
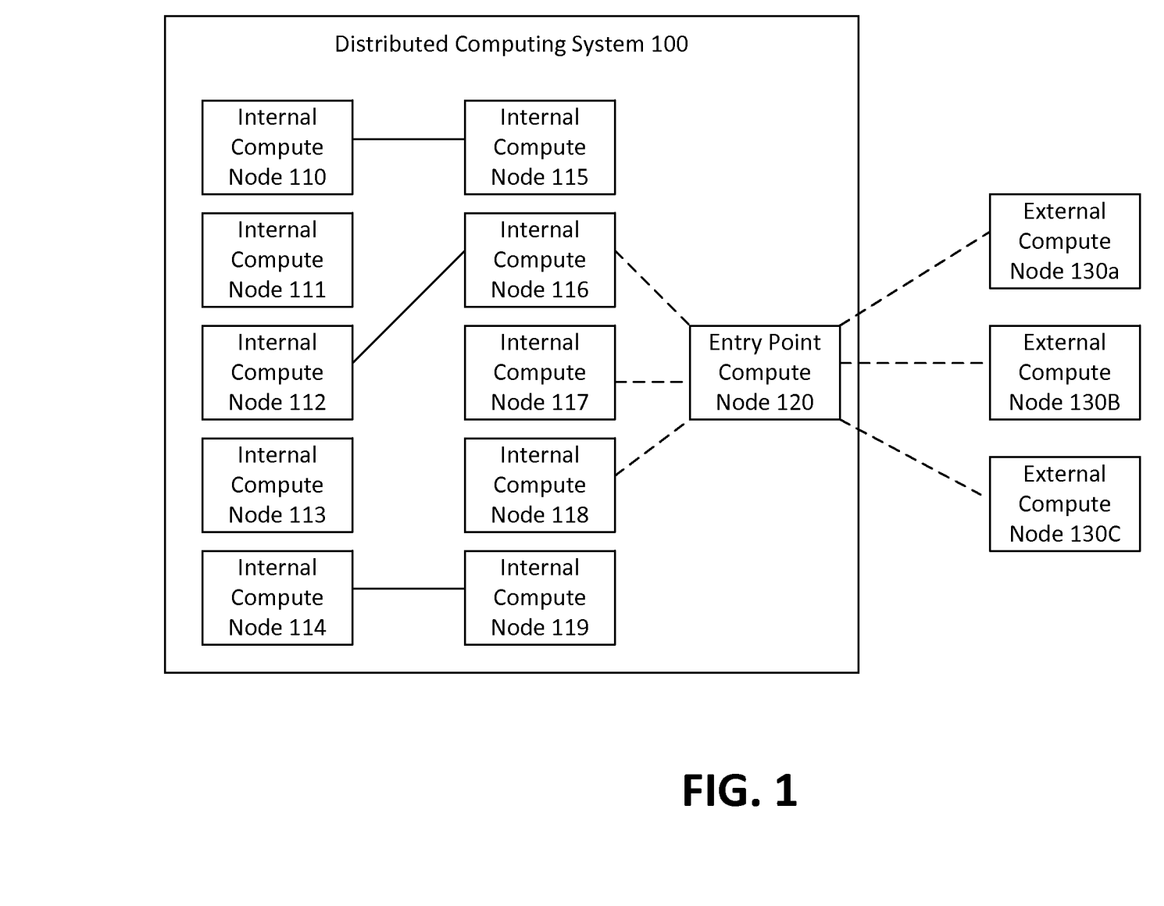
FIG. 1 is a diagram illustrating an example distributed computing system that may be used in accordance with the present disclosure.

FIG. 1 is a diagram illustrating an example distributed computing system 100 that may be used in accordance with the present disclosure. As shown, distributed computing system 100 includes internal compute nodes 110-119 and entry point compute node 120. A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes. In some examples, any, or all, of internal compute nodes 110-119 and entry point compute node 120 may include one or more servers and/or one or more virtual machines. It is noted that, although only a single entry point compute node 120 is shown FIG. 1, multiple entry point compute nodes may sometimes be used in accordance with the disclosed techniques. It is further noted that, while example distributed computing system 100 includes ten internal compute nodes, any number of different internal compute nodes may be allocated to a distributed computing system in accordance with the disclosed techniques. It is further noted that distributed computing system 100 is not limited to any particular geographic and/or physical characteristics. For example, in some cases, internal compute nodes 101-119 and entry point compute node 120 may be located in a single data center and/or may include devices in close geographic proximity to one another. By contrast, in other cases, one or more of internal compute nodes 101-119 and entry point compute node 120 may be distributed across multiple data centers and/or may include devices that are geographically remote from one another.

In some cases, internal compute nodes 110-119 may each execute one or more services, which may be, for example, individually executed services, micro-services, and/or portions of collectively executed services. For example, in some cases, internal compute nodes 110-119 may collectively execute one or more content execution, rendering, and distribution services, such as one or more video game execution, rendering, and streaming services. In some cases, one or more of internal compute nodes 110-119 may include, or may have access to, content processing components, such as one or more graphics processing units, audio processing components, and the like. In some cases, services may be duplicated, in whole or in part, on different internal compute nodes 110-119, such as to provide increased capability to process large numbers of requests, to provide ability to process requests at multiple different devices or geographic locations, and/or to provide redundancy in case of operating problems or failures at one or more nodes.

Internal compute nodes 110-119 may, for example, each be allocated to distributed computing system 100 using one or more authentication and/or validation processes to ensure that they are operated in a trustworthy and non-malicious manner. Also, in some cases, internal compute nodes 110-119 may include and/or may operate within components and/or devices that are known to be secure and trustworthy, such as one or more secure data centers, secure computing clusters, or any portions thereof. In some cases, once allocated to distributed computing system 100, internal compute nodes 110-119 may be mutually trusted such that they may freely establish communications with one another. For example, internal compute nodes 110-119 may be permitted to exchange messages between one another without approval from the entry point compute node 120. The free establishment of communications among internal compute nodes 110-119 is indicated by the solid lines depicting example communications paths between various internal compute nodes (e.g., nodes 110 and 115; nodes 112 and 116; and nodes 114 and 119). These communications paths are merely provided as examples, and it may be possible for any of the internal compute nodes 110-119 to free establish communications with any other of the internal compute nodes 110-119.

It may often be advantageous, however, for internal compute nodes 110-119 to interact with other compute nodes that are external to the distributed computing system 100. For example, FIG. 1 includes external compute nodes 130*a-c*, which are untrusted compute nodes external to the distributed computing system 100. As should be appreciated, although three external compute nodes 130*a-c* are shown in FIG. 1, distributed computing system 100 may communicate with any number of different external compute nodes. Communications from external compute nodes 130*a-c* to distributed computing system 100 are regulated by entry point compute node 120. The regulated nature of communications from external compute node 130 to distributed computing system 100 are indicated by the dashed lines showing communications from external compute nodes 130*a-c* to entry point compute node 120 and from entry point compute node 120 to internal compute nodes 116, 117, and 118. It is noted that element number 130 will be used hereinafter to refer to any particular one of external compute nodes 130*a-c*.

In some cases, external compute node 130 may request to communicate with distributed system 100, and the request may be received by entry point compute node 120. For example, external compute node 130 may request interaction with one or more services provided by distributed computing system 100. As a specific example, external compute node 130 may be a client device that is requesting for the distributed computing system to execute, render, and stream video game content to the client device. Upon receiving the request, entry point compute node 120 may determine that the request is issued by an external compute node, which is not trusted for communication with internal compute nodes 110-119.

Figure 2:
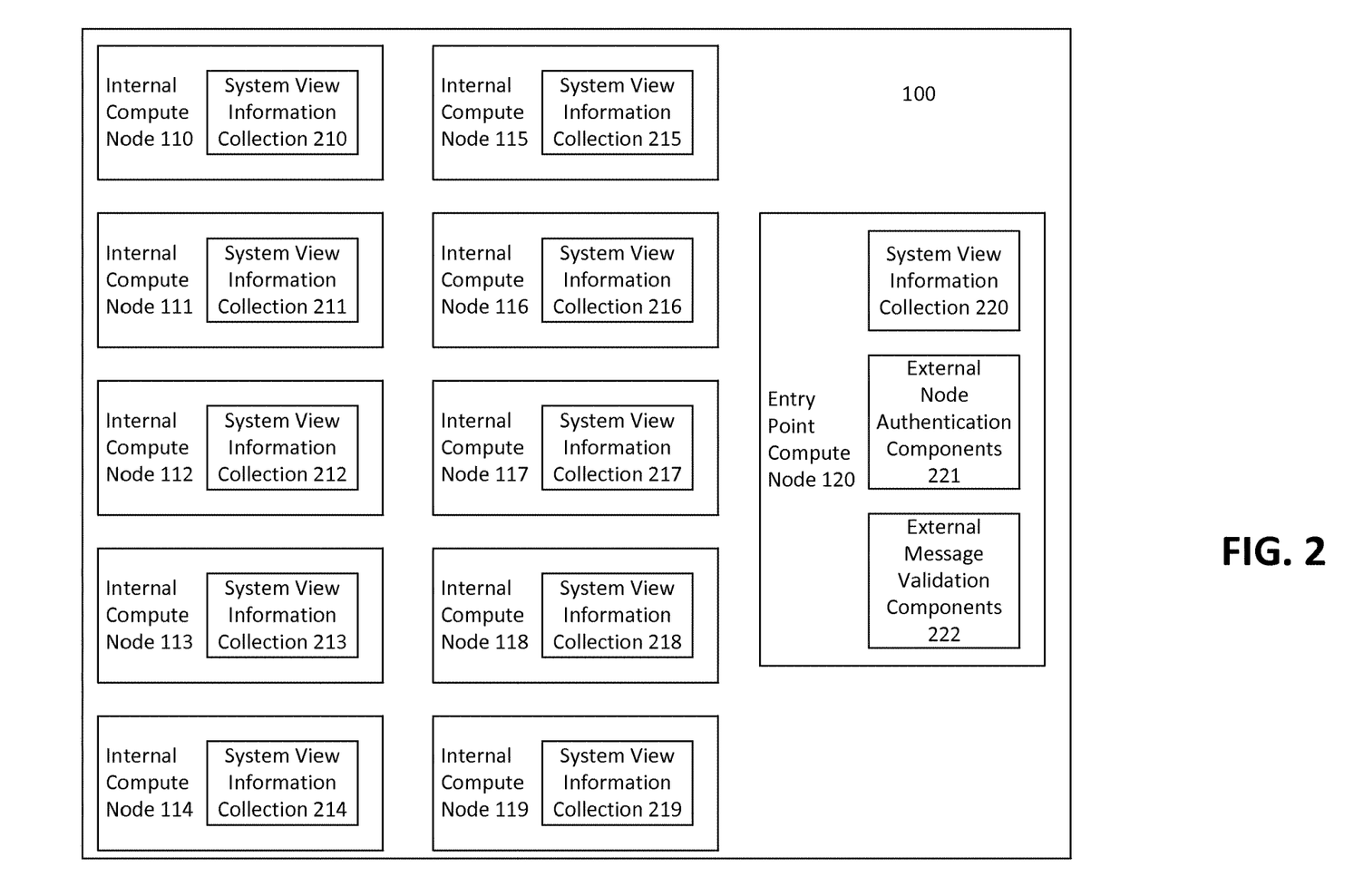
FIG. 2 is a diagrams illustrating example compute nodes within a distributed computing system that may be used in accordance with the present disclosure.

Referring now to FIG. 2, it is seen that entry point compute node 120 includes external node authentication components 221, which, upon receiving the request from external compute node 130, may be used to authenticate external compute node 130 for communications with distributed computing system 100. In some examples, external compute node 120 may be authenticated based on various techniques, such as matching of hardware and/or software identifiers associated with the external compute node 130 to one or more approved lists of identifiers, confirming that hardware and/or software identifiers associated with the external compute node 130 are not included on one or more disapproved lists of identifiers, and the like. If external compute node 130 fails to authenticate external compute node 120, then external compute node 120 may be excluded any further communications with distributed computing system 100. On the other hand, if external compute node 130 is authenticated, then entry point compute node may select one or more of internal compute nodes 110-119 for interaction with external compute node 130. This selection process may be performed, for example, based, at least in part, on system view information collection 220 and is described in detail below.

Additionally, entry point compute node 120 may inform external compute node 130 of its authentication for communications with distributed computing system 100. External compute node may then attempt to interact with the distributed computing system 100, such as by attempting to send various messages to the distributed computing system 100. For example, external compute node 130 may request initiation a streaming video game session and may begin to play a game, periodically returning user input, such as character movements, back to distributed computing system 100 for processing. It is noted, however, that even after its authentication, external compute node 130 may still be regulated such that its communications may be received and inspected by entry point compute node 120 before being provided to one or more of compute nodes 110-119. This may, for example, assist in preventing external compute node from performing unauthorized and/or malicious acts to data and/or other resources provided by distributed computing system 100.

In particular, as shown in FIG. 2, entry point compute node 120 includes external message validation components 222, which may, for example, receive and inspect incoming messages from external compute node 130 and validate the incoming messages before providing them to one or more of internal compute nodes 110-119 for processing. In some cases, the validation may be performed on a message-by-message basis such that each incoming message from external compute node 130 is validated prior to processing. In some cases, messages may be validated by confirming that the messages do not attempt to control, or otherwise manipulate, an object and/or data that the external compute node is not authorized to control and/or manipulate. For example, in the context of a video game, if external compute node 130 sends a message that attempts to control a character, vehicle, or object of nature that the external compute node 130 is not authorized to control, then the message may be invalidated. Also, in some cases, messages may be validated by confirming that the messages do not attempt to control, or otherwise manipulate, an object and/or data in a non-sensible or otherwise unauthorized manner. For example, in the context of a video game, if external compute node 130 sends a message that attempts to make a human character fly, then the message may be invalidated (unless the video game has authorized the human character to fly).

Once the message from external compute node 130 has been validated, entry point compute node 120 may forward the message to one or more of internal compute nodes 110-119 for processing. If, on the other hand, the message is invalidated, then entry point compute node 120 may decline to provide the message to any of internal compute nodes 110-119. In some cases, entry point compute node 120 may inform external compute node 130 of the invalidation of the message and optionally provide feedback regarding the reasons for the invalidation. In some cases, if external compute node 130 attempts to send too many invalidated messages, such as more than a threshold number of invalid messages, then external compute node 130 may be de-authenticated such that it can no longer communicate with distributed computing system 100. In some examples, multiple different invalid message number thresholds may be set for different time intervals, different service types, different message types, different client types, and other characteristics.

In some cases, for each authorized external compute node that is connected to the distributed computing system, the entry point compute node may create a replicant of the external compute node or another suitable component for regulating communications to and from the external compute node. Also, in some cases, in addition to incoming communications from the external compute node 130, outgoing communications to the external compute node 130 may also be inspected and validated or otherwise regulated by entry point 120. This may help to ensure, for example, that no confidential or otherwise unauthorized information is extracted from the distributed computing system 100.

In some cases, the physical and/or geographic locations of one or more internal compute nodes 110-119 and/or the services executed on one more internal compute nodes 110-119 may be determined based, at least in part, on a static message flow analysis. For example, various message types, or other categories of interactions between services, may be modeled, using, for example, a graph, and assigned weights based on characteristics, such as predicted frequency, associated message handler logic that generates additional messages, message size, cost associated with transfer of messages, and others. As a specific example, a timer message that is triggered every 2 seconds may, in some cases, be given a greater weight than a timer message is triggered every 10 minutes. In some cases, locations of various services within the distributed computing system may be determined based, at least in part, on a frequency associated with communications between the services. For example, services that communicate with one another more frequently may be arranged to execute on internal compute nodes 110-119 that are positioned in closer geographic proximity to one another or that otherwise communicate with lower expected latencies. This may reduce both time and cost associated with transfer of messages and interaction of services. In some cases, the above determinations may be made when the distributed computing system 100 is being initially configured and/or may be performed or updated during execution of the distributed computing system. For example, in some cases, one or more services may be moved or otherwise modified such as to reduce time and/or cost associated with message transfer and interaction of services.

In some cases, one or more of the compute nodes within the distributed computing system, such as any or all of internal compute nodes 110-119 and/or entry point compute node 120, may maintain respective collections of system view information. Each respective collection of system view information may include, for example, information associated with the corresponding compute node's view of the distributed system based on information that is available to the corresponding compute node. In the particular example, of FIG. 2, it is seen that each of internal compute nodes 110-119 includes a respective system view information collection 210-219 and the entry point compute node 120 includes a respective system view information collection 220.

System view information is information associated with the distributed computing system that may include, for example, indications of compute nodes within the distributed system, their associated devices and/or geographic locations, the services executing thereon, service workload information, information associated with latency for communicating with other nodes and/or services, idle status and/or non-idle status, availability status, and the like. In some cases, system view information may be exchanged, at least in part, among compute nodes using an epidemic protocol. The epidemic protocol may, for example, allow at least a portion of the respective collection of system view information 210-220 at each compute node 110-120 to eventually be provided to each other compute node 110-120. The epidemic protocol may provide a reliable means to allow for mutual exchange of system view information. However, while the epidemic protocol may be reliable, it may often be slow, and portions of the information exchanged using the epidemic protocol may sometimes be out-of-date (i.e., no longer valid) by the time they are eventually provided to one or more of nodes 110-120.

For these and other reasons, in addition, or as an alternative to, the epidemic protocol, system view information may also be exchanged among compute nodes 110-120 using other communications among compute nodes 110-120. For example, in some cases, system view information may be exchanged using naturally occurring interactions among compute nodes 110-120, such as service-related interactions between services on different compute nodes. For example, a service executing on a first compute node may determine to communicate with a service on a second compute node. A communications channel may then be established that enables interaction between the first and second compute nodes. While the communications channel is active, the first compute node and second compute nodes may use the communications channel to exchange various portions of system view information, and this information may be used to update each compute node's respective collection of system view information. This may be advantageous, for example, by allowing additional opportunities for exchange of system view information, while not requiring that a separate communication channel be established strictly for the purpose of exchanging system view information.

In some cases, the system view information exchanged by the first and the second compute node in the above-described example may include information associated with a latency for communications between the two nodes. The exchanged information may also include, for example, information associated with workloads for service on each of the first and the second compute nodes. Also, in some cases, the exchanged information may include information about other compute nodes with which each compute node may communicate. For example, the second compute node may provide, to the first compute node, information about services executing on the second compute node as well as services executing on other compute nodes with which the second compute node communicates.

System view information collections 210-220 may be used in a number of different manners. For example, in some cases, system view information collections 210-220 may be used by a particular internal compute node to select one or more other particular internal compute nodes with which to interact. For example, if a particular service on a particular internal compute node wishes to interact with another service, the particular service may consult the respective system view information collection on the particular internal compute node to identify on which other internal compute node the other service may be executing.

Additionally, as set forth above, in some cases, multiple redundant or partially redundant services may execute on multiple internal compute nodes. Thus, a particular service may sometimes determine that there are multiple other services that may be available for interaction with the particular service. In such cases, the particular service may sometimes use system view information to assist in selecting one or more or more of the multiple other available services with which to interact. For example, in some cases, the particular service may use system view information to select one or more of the multiple other available services based on geographic location and/or communications latency. In particular, system view information may be used to identify one or more of the multiple other available services that is geographically closest to the particular service or that is otherwise determined to have the lowest latency for communications with the particular service. As another example, in some cases, the particular service may use system view information to select one or more of the multiple other available services based on workloads of the other available services. In particular, system view information may be used to identify one or more of the multiple other available services that has the lowest workload for interaction with the particular service. Also, in some cases, one or more of multiple available services may be selected based on any combination of the above-described or other factors.

As yet another example, in some cases, a particular service may need to offload work to one or more of multiple other available services. In these cases, system view information may also be used to select one or more of the multiple other available services to which to offload work. Once again, the services to which to offload work may be selected based on factors such as geographic location, communications latency, relative workloads, or any combination of these and other factors. It is noted that selecting of compute nodes with which to interact based, at least in part on workload, may, in some cases, have the effect, over time, of balancing workload more evenly across distributed computing system 100 and may be beneficial for the system 100 as a whole, in addition to being beneficial to the particular nodes that are involved in a particular interaction.

In addition to internal communications, the system view information collection 220 at entry point compute node 120 may, in some cases, be used to select one or more of internal compute nodes 110-119 for interaction with external compute nodes, such as external compute node 130. The selected internal compute nodes may, for example, process messages from the external compute nodes with which they interact. For example, when multiple available internal compute nodes 110-119 may be used to interact with external compute node 130, entry point compute node 120 may select one or more of the multiple available internal compute nodes 110-119 for interaction with external compute node 130 based on various factors, such as geographic location relative to external compute node 130 and/or entry point compute node 120, latency for communications with external compute node 130 and/or entry point compute node 120, relative workloads, or any combination of these and other factors.

System view information may also, for example, be used to make determinations regarding allocating of additional internal compute nodes to distributed computing system 100 and/or de-allocation of existing internal compute nodes from distributed computing system 100. In particular, in some cases, system view information may include information regarding an idle or non-idle status and/or non-idle status of internal compute nodes within distributed computing system 100. In some cases, internal compute nodes 110-119 may employ one or more allocation thresholds for allocating additional internal compute nodes to the distributed computing system 100. An allocation threshold may be, for example, a determination that one or more internal compute nodes within the distributed computing system 100 are exceeding a particular proportion of operation in a non-idle state. This may include, for example, a determination that the internal compute nodes are collectively exceeding a particular proportion of operation in a non-idle state and/or that a particular proportion of internal compute nodes are individually exceeding a particular proportion of operation in a non-idle state. In some cases, when one or more of internal compute nodes within the distributed computing system 100 are exceeding a particular proportion of operation in a non-idle state, one or more additional internal compute nodes may be allocated to the distributed computing system 100. Also, in some cases, internal compute nodes 110-119 may employ one or more de-allocation thresholds for de-allocating internal compute nodes from the distributed computing system 100. A de-allocation threshold may be, for example, a determination that one or more internal compute nodes within the distributed computing system 100 are exceeding a particular proportion of operation in an idle state. This may include, for example, a determination that the internal compute nodes are collectively exceeding a particular proportion of operation in an idle state and/or that a particular proportion of internal compute nodes are individually exceeding a particular proportion of operation in an idle state. In some cases, when one or more of internal compute nodes within the distributed computing system 100 are exceeding a particular proportion of operation in an idle state, one or more existing internal compute nodes may be de-allocated from the distributed computing system 100.

In some cases, any, or all, of the internal compute nodes within the distributed computing system 100 may be capable of requesting allocation and/or de-allocation of internal compute nodes from distributed computing system 100. Accordingly, in some cases, it is possible that multiple internal compute nodes may issue duplicate allocation or de-allocation requests, thereby potentially resulting in more than a desired number of internal compute nodes being allocated or de-allocated from the distributed computing system 100. To help avoid such scenarios, one or more of the internal compute nodes may, in some cases, each issue allocation and/or de-allocation requests in accordance with an estimated probability. Each internal compute node may, for example, calculate its estimated probability to increase the likelihood of the group of all existing internal compute nodes, as a whole, collectively issuing only a desired number of allocation or de-allocation requests. This calculation may be based on various factors, such as the number of internal compute nodes that are desired for allocation or de-allocation, the number of existing internal compute nodes within the distributed computing system 100, and the likelihood that one or more other of the existing internal compute nodes will issue an allocation or de-allocation request. For example, consider the scenario in which a particular internal compute node determines that it desirable to allocate one new additional internal compute node, that there are currently ten existing internal compute nodes within the distributed computing system 100, and that each of the ten existing internal compute nodes is equally likely to issue an allocation request. In such a scenario, the particular internal compute node may determine that, if each of the ten internal compute nodes sets its estimated probability at ten percent, then this will provide the highest likelihood that the ten internal compute nodes, as a whole, will collectively issue only a single request to allocate one additional internal compute node. Accordingly, in some cases, the particular internal compute node may set its estimated probability at ten percent.

After determining its estimated probability, an internal compute node may then determine whether to issue an allocation or de-allocation request in accordance with the estimated probability. For example, in some cases, an internal compute node may initiate a routine that has a configurable likelihood of returning a first result relative to a second result. The internal compute node may then configure the likelihood of returning the first result based, at least in part, on the estimated probability. For example, in some cases, the internal compute node may configure the likelihood of returning the first result to be equivalent to the estimated probability. The internal compute node may then execute the routine, and the routine may return a result in response to its execution. In some cases, if the first result is returned, then the internal compute node may issue the allocation or de-allocation request. By contrast, if the second result is returned, then the internal compute node may determine not to issue the allocation or de-allocation request. In some cases, the routine may employ a random number generator in order to allow it to return the first or the second result in accordance with the configured likelihood.

With respect to de-allocation of internal compute nodes, it is noted that there are a number of different strategies that may be employed for determining which of the existing internal compute nodes will be selected for de-allocation. For example, in some cases, each of the internal compute nodes that issues a de-allocation request (using, for example, the estimated probabilities described above) may issue a request to de-allocate itself from the distributed computing system 100. In other cases, it is possible that an internal compute node may request de-allocation of another internal compute node, such as another internal compute node with a lowest current workload. Upon being de-allocated, the de-allocated node's workload may be moved to one or more other nodes, based on, for example, workload of other nodes, communications latency and/or geographic location of the de-allocated node with respect to other nodes, or any combination of these or other factors.

In some cases, various semantics may be developed and enforced with respect to services executing on each of the internal compute nodes within the distributed computing system 100. For example, in some cases, all messages may be mapped to a service-type sender. This may, for example, enforce that all messages may be suitably handled by an appropriate recipient. As another example, in some cases, service state modification may only be permitted to happen during message handling code, which may prevent inappropriate or undesired state modifications. As yet other examples, in some cases, trait annotations may be employed to enforce sets of messages that may be handled by a service, and direct memory modification may not be allowed. Also, in some cases, only specific data types may be enforced in the service state, but combination types may be allowed. Some example allowed data types may include list, map, array, integer, float, string, and others. The use of enforced semantics may, in some cases, allow for improved message transfer and handling, while also providing for improved error detection capabilities.

Figure 3:
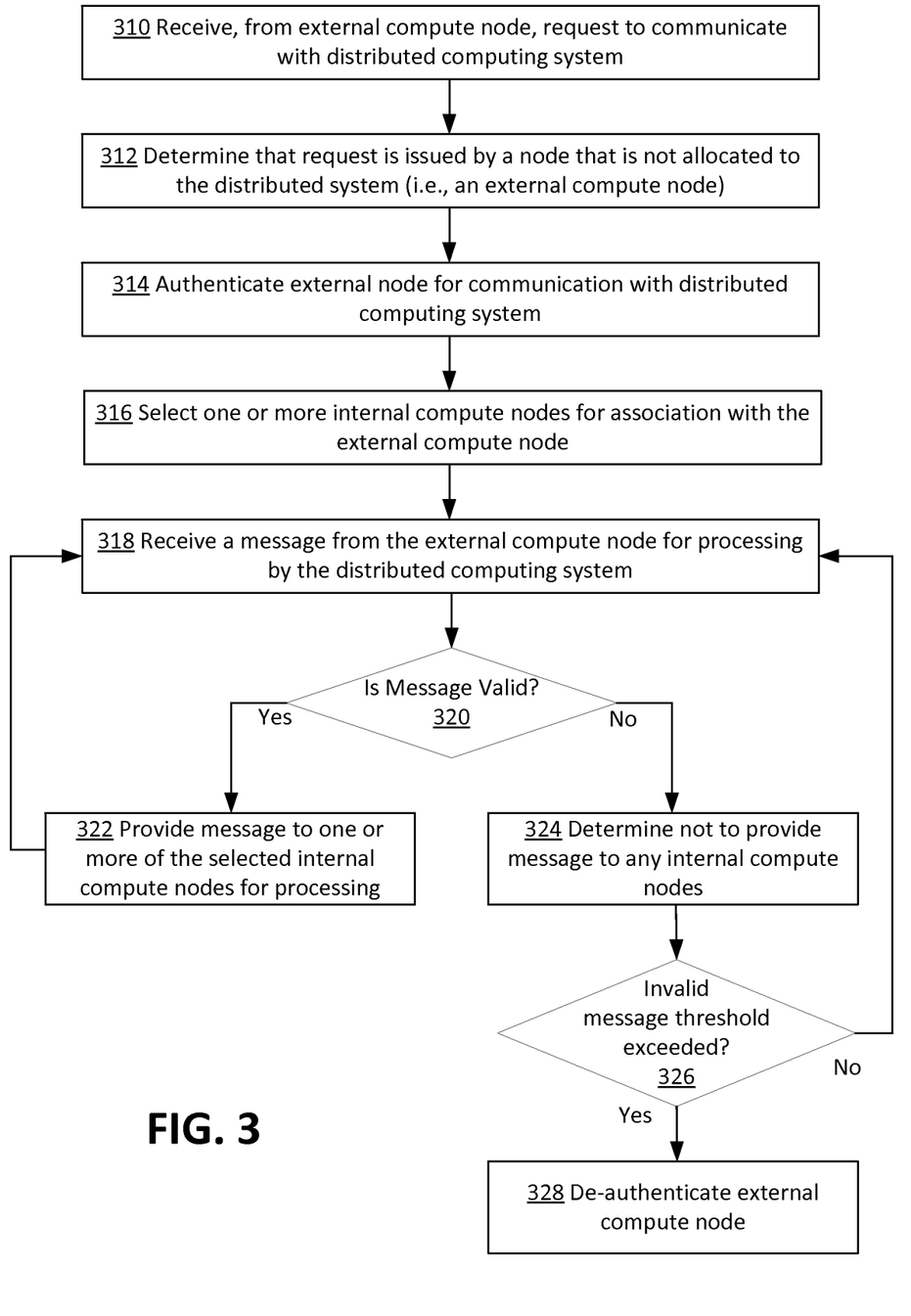
FIG. 3 is a diagram illustrating an example process for managing communications from an external compute node that may be used in accordance with the present disclosure.

Some example distributed computing system node management processes will now be described in detail. In particular, FIG. 3 is a diagram illustrating an example process for managing communications from an external compute node that may be used in accordance with the present disclosure. In some cases, the operations shown in FIG. 3 may be performed, in whole or in part, by one or more entry point compute nodes, such as entry point compute node 120 of FIGS. 1 and 2. As shown in FIG. 3, at operation 310, a request is received, from an external compute node, such as external compute node 130 of FIGS. 1 and 2, to communicate with a distributed computing system, such as distributed computing system 100 of FIGS. 1 and 2. As set forth above, the external compute node may be, for example, a client device, such as a client device that is requesting for the distributed computing system to execute, render, and stream video game content to the client device.

At operation 312, it may be determined that the request is issued by a node that is not allocated to the distributed computing system (i.e., an external compute node). For example, in some cases, an identifier associated with the requesting external compute node may be checked against a list of know nodes that are allocated to the distributed computing system (i.e., internal compute nodes) and determined not to be included in such a list. As set forth above, in some cases, external compute nodes may not be trusted for communication with the distributed computing system. At operation 314, the external compute is authenticated for communications with distributed computing system 100. The external compute node may be authenticated by, for example, external node authentication components 221 of FIG. 2. Some example authentication techniques are described above and are not repeated here. Also, as set forth above, in cases when the external compute node fails the authentication process, then the external compute node may be excluded from any further communications with distributed computing system.

Once the external compute node 120 has been properly authenticated, then, at operation 316, one or more internal compute nodes may be selected for interaction with the external compute node. As set forth above, the selection of internal compute nodes at operation 316 may be based on, for example, system view information available to the entry point compute node, such as system view information collection 220 of FIG. 2. In some cases, multiple different internal compute nodes may be available to communicate with the external compute node, and the entry point compute node may select one or more of the multiple available internal compute nodes for communication with the external compute node based on various factors, such as their geographic location relative to the external compute node and/or the entry point compute node, latency for communications with the external compute node and/or the entry point compute node, their relative workloads, or any combination of these and other factors.

Additionally, after being authenticated, the external compute node may attempt to interact with the distributed computing system, such as by sending various messages to the distributed computing system 100. At operation 318, a message from the external compute node is received for processing by the distributed computing system. At operation 320, it is determined whether the received message is a valid message. As set forth above, messages from an external compute node may be received and inspected for validation by, for example, external message validation components 222. In some cases, the validation may be performed on a message-by-message basis such that each incoming message from the external compute node is validated prior to processing. As also set forth above, in some cases, a message may be invalidated based, at least in part, on a determination that the message attempts to control, or otherwise manipulate, an object and/or data that the external compute node is not authorized to control and/or manipulate. Also, in some cases, a message may be invalidated based, at least in part, on a determination that the message attempts to control, or otherwise manipulate, an object and/or data in a non-sensible or otherwise unauthorized manner.

If the incoming message from the external compute node is validated, then, at operation 322, the message may be forwarded to one or more of the selected internal compute nodes for processing. The process may then return to operation 318, where additional incoming messages may be received from the external compute node. If, on the other hand, the message is invalidated, then, at operation 324, it may be determined not to provide the message to any internal compute nodes. As set forth above, in some cases, the entry point compute node may inform the external compute node of the invalidation of the message and optionally provide feedback regarding the reasons for the invalidation. At operation 326, it is determined whether the external compute node exceeded an invalid message threshold (e.g., sent more than a threshold number of invalid messages). If the invalid message threshold is exceeded, then, at operation 328, the external compute node may be de-authenticated such that it can no longer communicate with distributed computing system. If, on the other hand, the invalid message threshold is not exceeded, then the process may return to operation 318, where additional incoming messages may be received from the external compute node.

Figure 4:
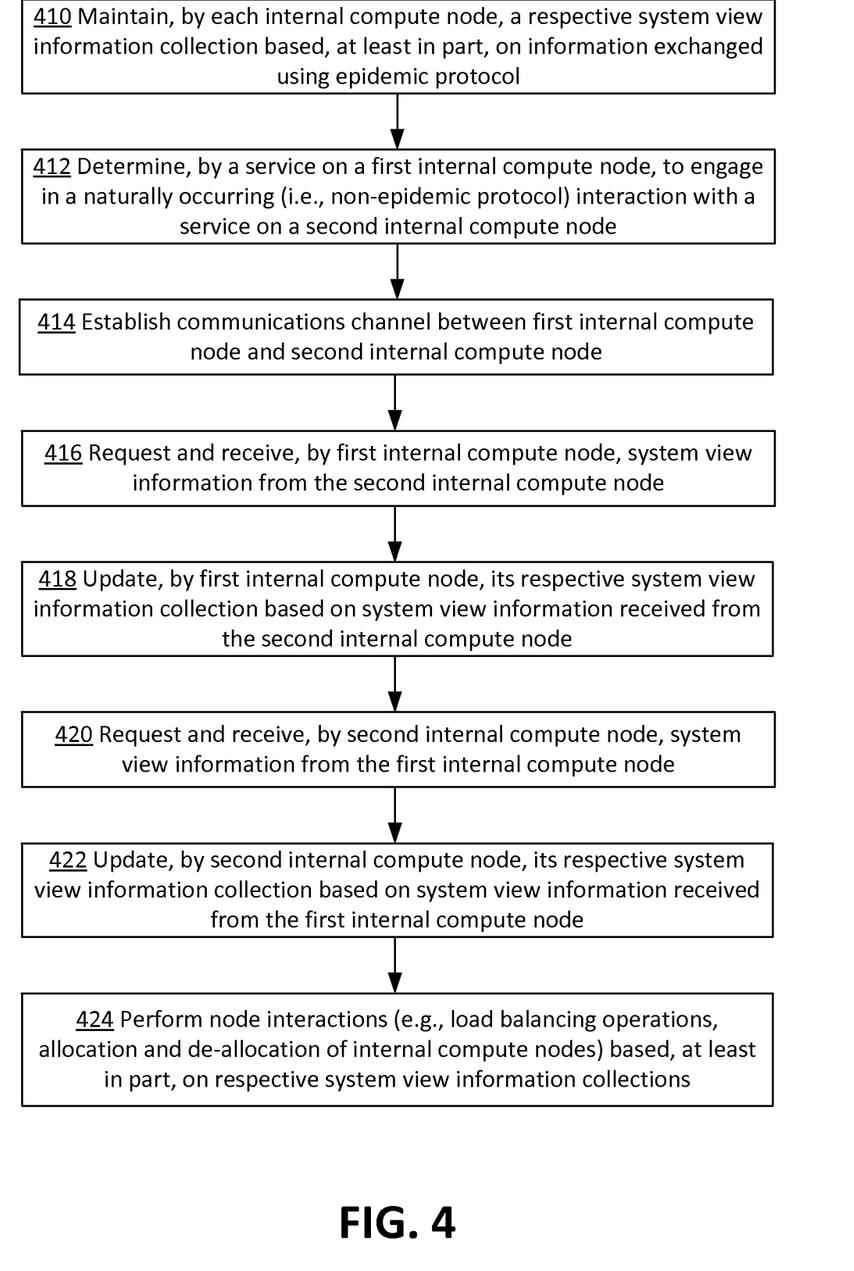
FIG. 4 is a diagram illustrating an example system view information collection management process that may be used in accordance with the present disclosure.

Referring now to FIG. 4, an example system view information collection management process that may be used in accordance with the present disclosure will now be described in detail. As shown in FIG. 4, at operation 410, each internal compute node within the distributed system may maintain its own respective system view information using, at least in part, an epidemic protocol. The epidemic protocol may, for example, allow at least a portion of the respective collection of system view information at each internal compute node to eventually be provided to each other internal compute node. For example, as shown in FIG. 2, each internal compute node 110-119 includes a respective system view information collection 210-219. As set forth above, each respective collection of system view information may include, for example, information associated with the corresponding compute node's view of the distributed system based on information that is available to the corresponding compute node. As also set forth above, system view information is information associated with the distributed computing system that may include, for example, indications of compute nodes within the distributed system, their associated devices and/or geographic locations, the services executing thereon, service workload information, information associated with latency for communicating with other nodes and/or services, idle status and/or non-idle status, availability status, and the like.

As described above, in addition, or as an alternative to, the epidemic protocol, system view information may also be exchanged among internal compute nodes using, for example, naturally occurring interactions among the internal compute nodes. In particular, at operation 412, a service on a first internal compute node may determine to engage in a naturally occurring (i.e., non-epidemic protocol) interaction with a service on a second internal compute node. At operation 414, a communications channel may then be established that enables interaction between the first and second compute nodes. The communications channel is not established as part of execution of the epidemic protocol. While the communications channel is active, at operation 416, the first internal compute node may request and receive system view information from the second internal compute node. The system view information received at operation 416 may include, for example, information associated with a location (e.g., geographic location) of the second compute node, information associated with latency for communications between the first and second internal compute nodes, and workload information for services executing on the second internal compute node. Also, in some cases, the exchanged information may include information about other compute nodes and the services executing thereon, such as other compute nodes with which the second compute node frequently communicates. At operation, 418, the first internal compute node updates its respective collection of system view information based on the system view information received from the second internal compute node at operation 416. Also, while the communications channel is active, at operation 420, the second internal compute node may request and receive system view information from the first internal compute node. The system view information received at operation 420 may include, for example, information associated with a location (e.g., geographic location) of the first compute node, information associated with latency for communications between the first and second internal compute nodes, and workload information for services executing on the first internal compute node. Also, in some cases, the exchanged information may include information about other compute nodes and the services executing thereon, such as other compute nodes with which the first compute node frequently communicates. At operation, 422, the second internal compute node updates its respective collection of system view information based on the system view information received from the first internal compute node at operation 420.

At operation 424, the internal compute nodes within the distributed system may perform various node interactions based, at least in part, on their respective collections of system view information. For example, as set forth above, system view information may be used by a particular internal compute node to select one or other internal compute nodes with which to interact. For example, if a particular service on a particular internal compute node wishes to interact with another service, the particular service may consult system view information to identify on which other internal compute node the other service may be executing. As also set forth above, in some cases, multiple redundant or partially redundant services may execute on multiple internal compute nodes. In such cases, a particular service may sometimes use its respective collection of system view information to assist in selecting one or more or more of the multiple other available services with which to interact. As yet another example, in some cases, a particular service may need to offload work to one or more of multiple other available services. In these cases, system view information may also be used to select one or more of multiple other available services to which to offload work.

Figure 5:
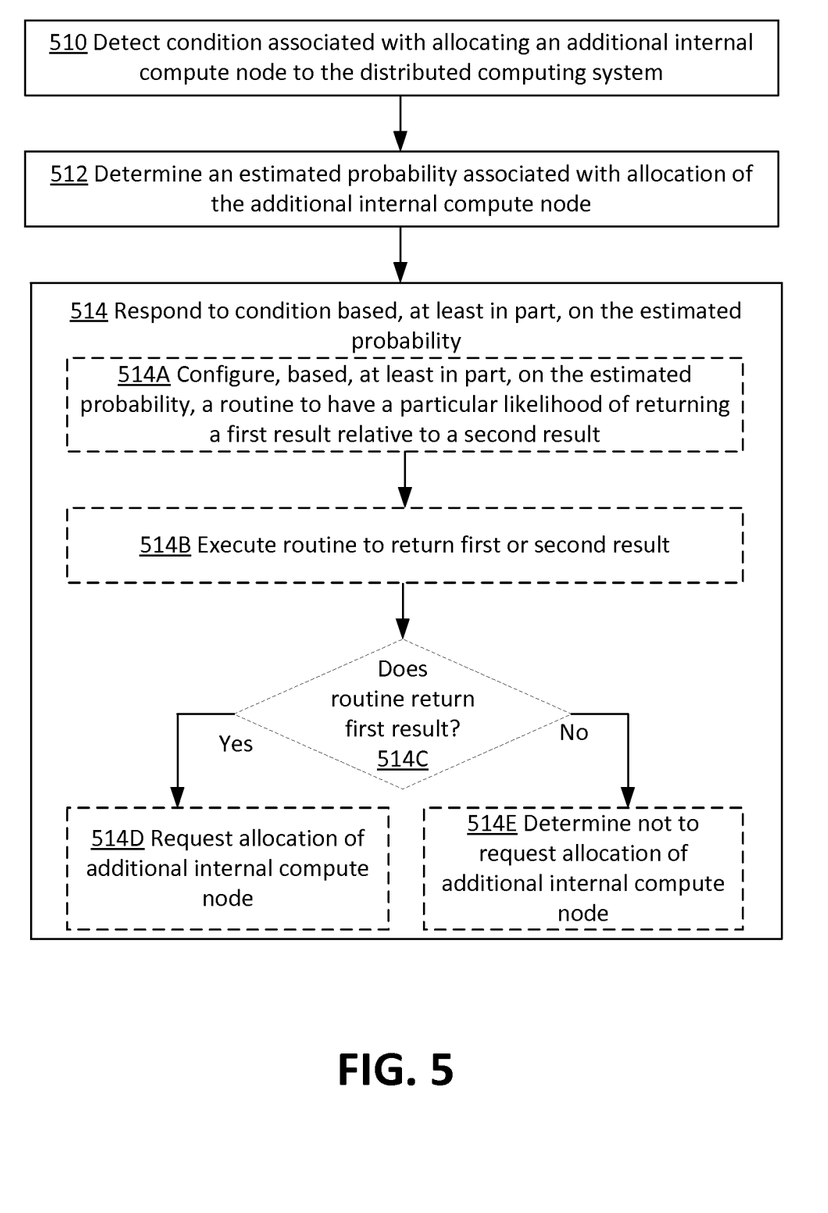
FIG. 5 is a diagram illustrating an example compute node allocation process that may be used in accordance with the present disclosure.

Referring now to FIG. 5, an example compute node allocation process that may be used in accordance with the present disclosure will now be described in detail. In some cases, the process shown and described with respect to FIG. 5 may be performed separately by each of one or more internal compute nodes, and, in some cases, all internal compute nodes, within the distributed computing system. As shown in FIG. 5, at operation 510, a condition associated with allocating an additional internal compute node to the distributed computing system is detected. In some cases, the condition detected at operation 510 may include, for example, a condition associated with an allocation threshold for allocating additional internal compute nodes to the distributed computing system. As set forth above, an allocation threshold may be, for example, a determination that one or more existing internal compute nodes within the distributed computing system are exceeding a particular proportion of operation in a non-idle state. This may include, for example, a determination that the internal compute nodes are collectively exceeding a particular proportion of operation in a non-idle state and/or that a particular proportion of internal compute nodes are individually exceeding a particular proportion of operation in a non-idle state. In some cases, the condition detected at operation 510 may occur, for example, when it is determined that one or more existing internal compute nodes within the distributed computing system are exceeding a particular proportion of operation in a non-idle state.

At operation 512, an estimated probability associated with allocation of an additional compute node is determined. As set forth above, in some cases, it is possible that multiple internal compute nodes may issue duplicate allocation requests, thereby potentially resulting in more than a desired number of internal compute nodes being allocated to the distributed computing system. To help avoid such scenarios, one or more of the internal compute nodes may, in some cases, each issue allocation requests in accordance with an estimated probability. The estimated probability may, for example, be calculated to increase the likelihood of the group of all existing internal compute nodes, as a whole, will collectively issue only a desired number of allocation requests. As set forth above, this calculation may be based on various factors, such as the number of internal compute nodes that are desired for allocation, the number of existing internal compute nodes within the distributed computing system, and the likelihood that one or more other of the existing internal compute nodes will issue an allocation request. Some example estimated probability determinations are described in detail above and are not repeated here.

At operation 514, the condition is responded to based, at least in part, on the estimated probability determined at operation 512. For example, a determination of whether or not to issue a de-allocation may be made based, at least in part, on the estimated probability. As shown in FIG. 5, operation 514 may, for example, include optional sub-operations 514A-E, which may, in some cases, optionally be performed as part of operation 514. In particular, at sub-operation 514A, a routine may be configured, based, at least in part, on the estimated probability, to have a particular likelihood of returning a first result relative to a second result. For example, in some cases, the likelihood of the routine to return the first result may be configured to match the estimated probability. At sub-operation 514B, the routine is executed, and execution of the routing causes the routine to return either the first result or the second result. It is noted, however, that the first result and the second result may each include one or more outcomes that are grouped into the first result and the second result. At sub-operation 514C, it is determined whether the routine returns the first result or the second result. If the routine returns the first result, then, at operation 514D, a request is issued to allocate an additional internal compute node to the distributed computing system. If, on the other hand, the routine returns the second result (i.e., the routine does not return the first result), then, at operation 514E, it is determined not to request allocation of an addition internal compute node. As set forth above, however, the determination at operation 514E not to issue an allocation request does not necessarily mean that no additional node will be allocated. This is because another internal compute node within the distributed computing system may separately perform the process of FIG. 5 and may determine, based on its separate execution of the process, to issue such an allocation request.

Figure 6:
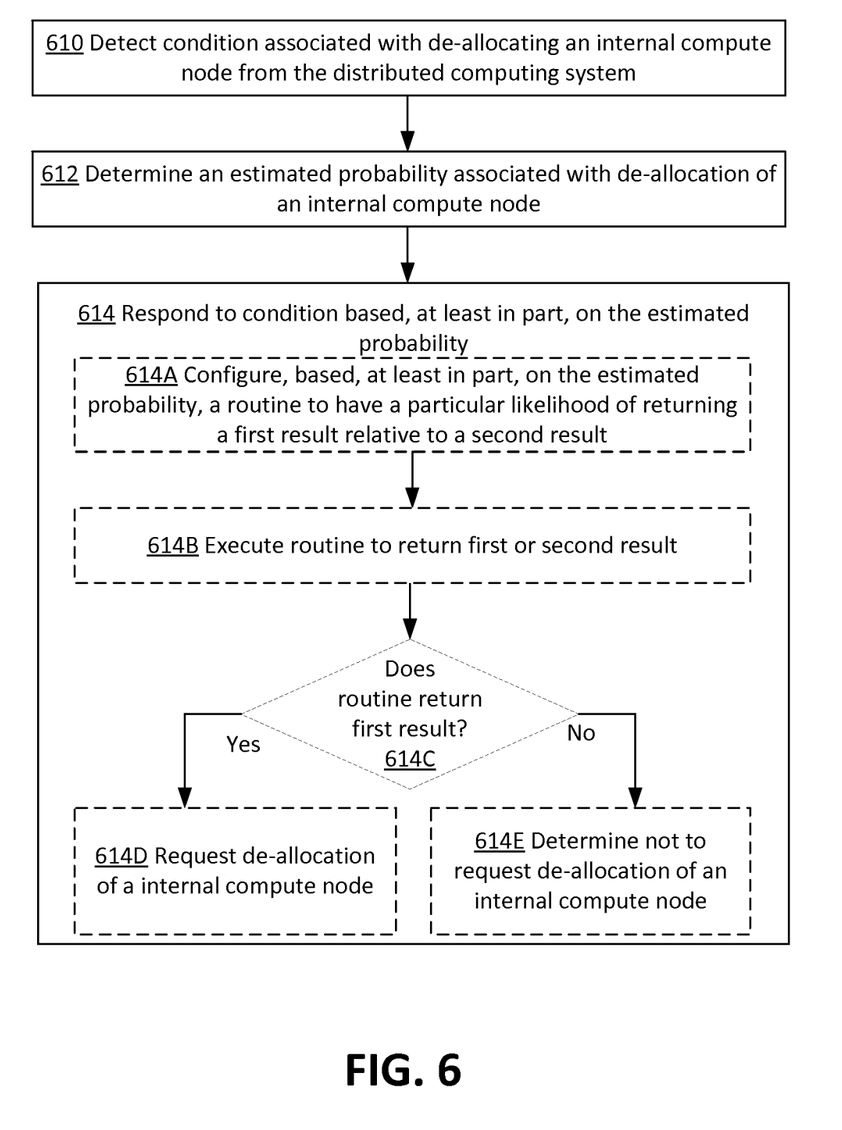
FIG. 6 is a diagram illustrating an example compute node de-allocation process that may be used in accordance with the present disclosure.

Referring now to FIG. 6, an example compute node de-allocation process that may be used in accordance with the present disclosure will now be described in detail. In some cases, the process shown and described with respect to FIG. 6 may be performed separately by each of one or more internal compute nodes, and, in some cases, all internal compute nodes, within the distributed computing system. As shown in FIG. 6, at operation 610, a condition associated with de-allocating an internal compute node from the distributed computing system is detected. In some cases, the condition detected at operation 610 may include, for example, a condition associated with a de-allocation threshold for de-allocating existing internal compute nodes from the distributed computing system. As set forth above, a de-allocation threshold may be, for example, a determination that one or more existing internal compute nodes within the distributed computing system are exceeding a particular proportion of operation in an idle state. This may include, for example, a determination that the internal compute nodes are collectively exceeding a particular proportion of operation in an idle state and/or that a particular proportion of internal compute nodes are individually exceeding a particular proportion of operation in an idle state. In some cases, the condition detected at operation 610 may occur, for example, when it is determined that one or more existing internal compute nodes within the distributed computing system are exceeding a particular proportion of operation in an idle state.

At operation 612, an estimated probability associated with de-allocation of an internal compute node is determined. As set forth above, in some cases, it is possible that multiple internal compute nodes may issue duplicate de-allocation requests, thereby potentially resulting in more than a desired number of internal compute nodes being de-allocated from the distributed computing system. To help avoid such scenarios, one or more of the internal compute nodes may, in some cases, each issue de-allocation requests in accordance with an estimated probability. The estimated probability may, for example, be calculated to increase the likelihood that the group of all existing internal compute nodes, as a whole, will collectively issue only a desired number of de-allocation requests. As set forth above, this calculation may be based on various factors, such as the number of internal compute nodes that are desired for de-allocation, the number of existing internal compute nodes within the distributed computing system, and the likelihood that one or more other of the existing internal compute nodes will issue a de-allocation request. Some example estimated probability determinations are described in detail above and are not repeated here.

At operation 614, the condition is responded to based, at least in part, on the estimated probability determined at operation 612. For example, a determination of whether or not to issue a de-allocation may be made based, at least in part, on the estimated probability. As shown in FIG. 6, operation 614 may, for example, include optional sub-operations 614A-E, which may, in some cases, optionally be performed as part of operation 614. In particular, at sub-operation 614A, a routine may be configured, based, at least in part, on the estimated probability, to have a particular likelihood of returning a first result relative to a second result. For example, in some cases, the likelihood of the routine to return the first result may be configured to match the estimated probability. At sub-operation 614B, the routine is executed, and execution of the routing causes the routine to return either the first result or the second result. It is noted, however, that the first result and the second result may each include one or more outcomes that are grouped into the first result and the second result. At sub-operation 614C, it is determined whether the routine returns the first result or the second result. If the routine returns the first result, then, at operation 614D, a request is issued to de-allocate an internal compute node from the distributed computing system. As set forth above, in some cases, an internal compute node may request to de-allocate itself from the distributed computing system and/or may request de-allocation of one or more other internal compute nodes. If, on the other hand, the routine returns the second result (i.e., the routine does not return the first result), then, at operation 614E, it is determined not to request de-allocation of an addition internal compute node. As set forth above, however, the determination at operation 614E not to issue a de-allocation request does not necessarily mean that no existing node will be de-allocated. This is because another internal compute node within the distributed computing system may separately perform the process of FIG. 6 and may determine, based on its separate execution of the process, to issue such a de-allocation request.

Figure 7:
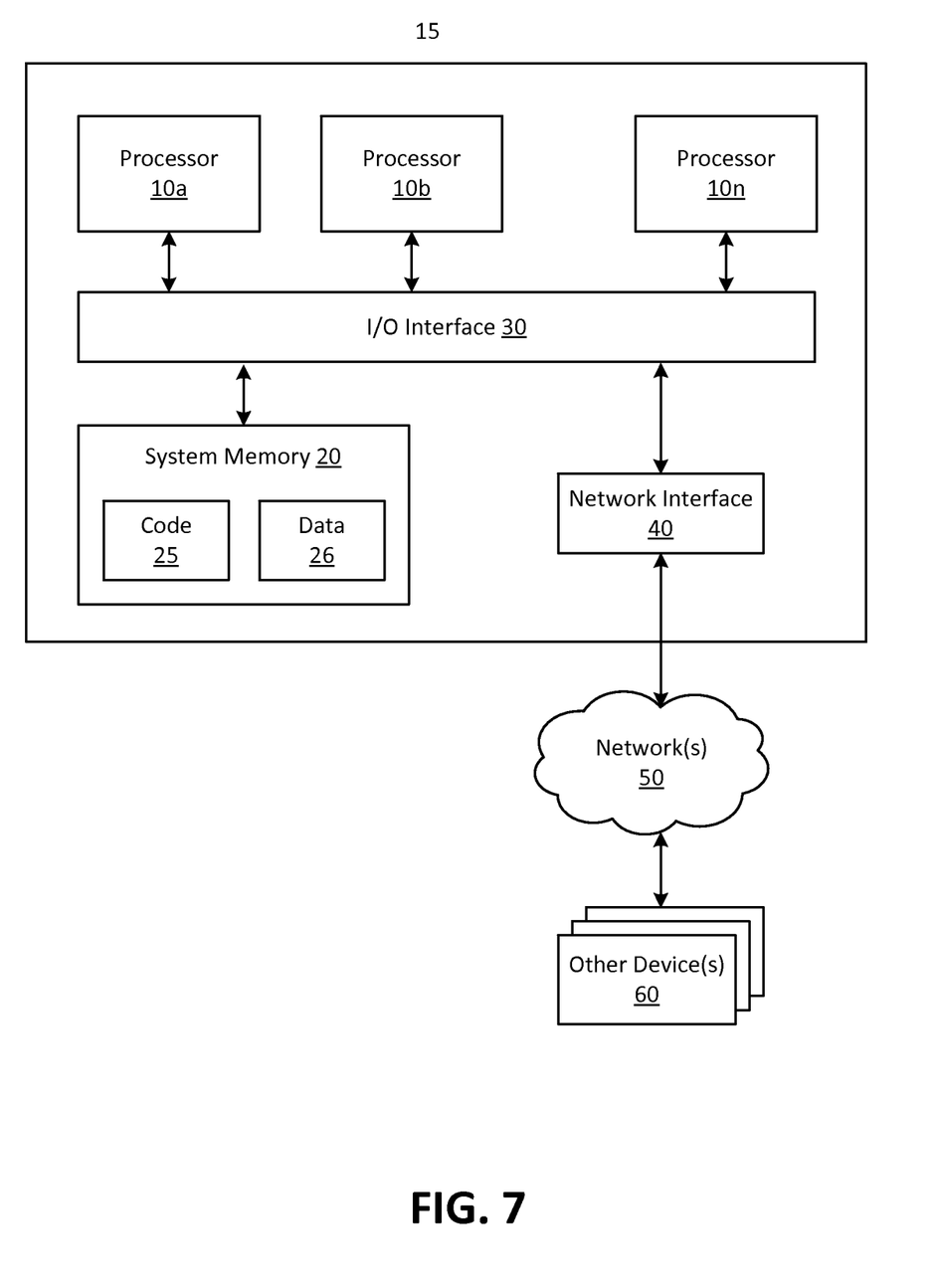
FIG. 7 is a diagram illustrating an example computing system that may be used in accordance with the present disclosure.

In at least some embodiments, one or more compute nodes that implement a portion or all of one or more of the technologies described herein may include or may be associated with a general-purpose computer system that includes or is configured to access one or more computer-accessible media. FIG. 7 depicts a general-purpose computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A distributed computing system comprising:
   one or more processors;
   one or more memories;
   a plurality of internal compute nodes, wherein the plurality of internal compute nodes are permitted to exchange messages between one another without approval from one or more entry point compute nodes; and
   the one or more entry point compute nodes, which are operable to perform operations comprising:
      receiving, from an external compute node, a request to communicate with a video game executed by the plurality of internal compute nodes of the distributed computing system;
      authenticate that the external compute node is authorized to communicate with the distributed computing system;
      selecting one or more selected internal compute nodes to process a plurality of messages for executing the video game from the external compute node, wherein the selecting of the one or more selected internal compute nodes to process the plurality of messages for executing the video game is based at least in part on a latency for communications between the external compute node and the one or more selected internal compute nodes;
      receiving a first message of the plurality of messages from the external compute node, wherein the first message includes user input for control of a character in the video game;
      determining that the first message is a valid message; and
      providing the first message to the one or more selected internal compute nodes.

2. The distributed computing system of claim 1, wherein the one or more selected internal compute nodes are selected based at least in part on one or more collections of system view information accessible to the one or more entry point compute nodes, and wherein the one or more collections of system view information comprise at least one of an indication of the plurality of internal compute nodes, their associated devices, their associated geographic locations, services executing on the plurality of internal compute nodes, or service workload information.

3. The distributed computing system of claim 1, wherein the one or more entry point compute nodes are operable to perform operations comprising:
   determining that a second message has caused an invalid message threshold for the external compute to be exceeded, wherein the second message includes additional user input for character control in the video game; and
   de-authenticating the external compute node for communicating with the distributed computing system.

4. A computer-implemented method for managing communications associated with a distributed computing system comprising:
   receiving, by one or more first compute nodes, from a second compute node, a request to communicate with a video game executed by a plurality of third compute nodes of the distributed computing system, wherein the plurality of third compute nodes are permitted to exchange messages between one another without approval from the one or more first compute nodes;
   authenticating the second compute node for communication with the distributed computing system
   selecting, by the one or more first compute nodes, one or more selected third compute nodes to process a plurality of messages for executing the video game from the second compute node, wherein the selecting of the one or more selected third compute nodes to process the plurality of messages for executing the video game is based at least in part on a latency for communications between the second compute node and the one or more selected third compute nodes;
   receiving, by the one or more first compute nodes, a first message of the plurality of messages from the second compute node, wherein the first message includes user input for control of a character in the video game;
   determining, by the one or more first compute nodes, that the first message is a valid message; and
   providing, by the one or more first compute nodes, the first message to the one or more selected third compute nodes.

5. The computer-implemented method of claim 4, further comprising identifying that the second compute node is not allocated to the distributed computing system.

6. The computer-implemented method of claim 4, wherein a second message is determined not to be valid based, in part, on a determination that the second message attempts to control an object in an unauthorized manner.

7. The computer-implemented method of claim 4, wherein the one or more selected third compute nodes are selected based at least in part on one or more collections of system view information accessible to the one or more first compute nodes.

8. The computer-implemented method of claim 7, wherein the one or more collections of system view information comprise at least one of an indication of the plurality of third compute nodes, their associated devices, their associated geographic locations, services executing on the plurality of third compute nodes, or service workload information.

9. The computer-implemented method of claim 4, wherein the computer-implemented method further comprises:
   determining that a second message has caused an invalid message threshold for the second compute node to be exceeded, wherein the second message includes additional user input for character control in the video game; and de-authenticating the second compute node for communicating with the distributed computing system.

10. One or more non-transitory computer-readable storage media having stored thereon instructions that, upon execution by one or more first compute nodes, cause the one or more first compute nodes to perform operations comprising:

receiving, by the one or more first compute nodes, from a second compute node, a request to communicate with a video game executed by a plurality of third compute nodes of a distributed computing system, wherein the plurality of third compute nodes are permitted to exchange messages between one another without approval from the one or more first compute nodes;

authenticating the second compute node for communication with the distributed computing system selecting, by the one or more first compute nodes, one or more selected third compute nodes to process a plurality of messages for executing the video game from the second compute node, wherein the selecting of the one or more selected third compute nodes to process the plurality of messages for executing the video game is based at least in part on a latency for communications between the second compute node and the one or more selected third compute nodes;

receiving, by the one or more first compute nodes, a first message of the plurality of messages from the second compute node, wherein the first message includes user input for control of a character in the video game;

determining, by the one or more first compute nodes, that the first message is a valid message; and providing, by the one or more first compute nodes, the first message to the one or more selected third compute nodes.

11. The one or more non-transitory computer-readable storage media of claim 10, further comprising identifying that the second compute node is not allocated to the distributed computing system.

12. The one or more non-transitory computer-readable storage media of claim 10, wherein a second message is determined not to be valid based, in part, on a determination that the second message attempts to control an object in an unauthorized manner.

13. The one or more non-transitory computer-readable storage media of claim 10, wherein the one or more selected third compute nodes are selected based at least in part on one or more collections of system view information accessible to the one or more first compute nodes.

14. The one or more non-transitory computer-readable storage media of claim 13, wherein the one or more collections of system view information comprise at least one of an indication of the plurality of third compute nodes, their associated devices, their associated geographic locations, services executing on the plurality of third compute nodes, or service workload information.

15. The one or more non-transitory computer-readable storage media of claim 10, wherein the operations further comprise:

determining that a second message has caused an invalid message threshold for the second compute node to be exceeded, wherein the second message includes additional user input for character control in the video game; and de-authenticating the second compute node for communicating with the distributed computing system.

* * * * *